(12) United States Patent
Abe et al.

(10) Patent No.: US 6,217,221 B1
(45) Date of Patent: Apr. 17, 2001

(54) ROLLING BEARING AND ROLLING BEARING DEVICE

(75) Inventors: Shinji Abe, Ikoma-Gun; Masahiro Mukasa, Nara, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/385,358

(22) Filed: Aug. 30, 1999

(30) Foreign Application Priority Data

Aug. 28, 1998 (JP) .................................................. 10-243946

(51) Int. Cl.$^7$ .............................. F16C 17/22; F16C 33/62
(52) U.S. Cl. ............................................. 384/493; 384/492
(58) Field of Search ................................. 384/492, 493, 384/905, 907.1

(56) References Cited

U.S. PATENT DOCUMENTS

| | | | |
|---|---|---|---|
| 4,634,300 | * 1/1987 | Takebayashi et al. | 384/492 X |
| 4,907,897 | * 3/1990 | Shirotori | 384/446 |
| 4,966,552 | * 10/1990 | Gonser | 384/492 X |
| 5,112,147 | * 5/1992 | Imamura et al. | 384/605 |
| 5,228,786 | * 7/1993 | Tanimoto | 384/492 |

* cited by examiner

*Primary Examiner*—Thomas R. Hannon
(74) *Attorney, Agent, or Firm*—Rabin & Champagne, PC

(57) ABSTRACT

A rolling bearing comprises an inner ring, an outer ring and a plurality of rolling elements therebetween, and is used, for example, in a spindle motor for driving a hard disk. The inner ring is made of, for example, high-carbon chromium steel, the outer ring is made of, for example, stainless steel, and each rolling element is made of ceramics, for example zirconia, of which coefficient of linear expansion is in the range of $7 \times 10^{-6}/°$ C. to $15 \times 10^{-6}/°$ C. The bearing rings and the rolling elements are substantially equal to each other in coefficient of linear expansion. Thus, the change in pre-load due to temperature variations is small.

7 Claims, 2 Drawing Sheets

ROLLING BEARING AND ROLLING BEARING DEVICE

CROSS REFERENCE TO RELATED APPLICATION

This application claims priority benefits under 35 USC, Article § 119 of Japanese Patent Application Serial No. 10-243946, filed on Aug. 27th, 1998 with the Japanese Patent Office, the disclosure of which is incorporated herein by reference.

BACKGROUND OF THE INVENTION

1. Field of the Invention

The present invention relates to a rolling bearing and a rolling bearing device, each of which is to be used in a spindle motor for driving a hard disk, a polygon mirror or the like.

2. Description of Related Arts

There is known a spindle motor for rotationally driving a magnetic disk serving as a recording medium. A magnetic disk is generally supported by a rotor hub supported rotatably relatively to a stationary shaft member. The spindle motor of this type includes a ball bearing made of a steel-type material for supporting the inner periphery of the rotor hub directly or indirectly through a spacer made of a steel-type material.

Magnetic disks made of aluminium disks are generally used, but magnetic disks mainly composed of glass disks are now also widespread.

When a rotor hub made of aluminium is used for a magnetic disk of aluminium, the rotor hub will not be greatly deformed in shape due to temperature variations because the rotor hub and the magnetic disk are the same in coefficient of thermal expansion.

However, when a rotor hub made of aluminium is used for a magnetic disk of glass, the rotor hub will be relatively greatly deformed in shape. If the rotor hub is relatively greatly deformed in shape, the magnetic disk supported by the rotor hub is moved from the regular position or changed in surface angle with respect to a reading/writing head from the regular surface angle. This involves the likelihood that the reading device makes a reading error and/or a writing error with respect to a magnetic disk, and that the magnetic disk or the reading/writing head is damaged.

For a glass-made magnetic disk, it is therefore preferable to use a rotor hub made of stainless steel lower in coefficient of linear expansion than aluminium.

On the other hand, to improve the lubrication lifetime under high-speed and high-temperature conditions, a hard disk driving spindle motor is increasingly using a rolling bearing comprising balls made of silicon nitride.

To obtain high rotational precision, the spindle motor above-mentioned is used with a pre-load applied to the ball bearing. In the spindle motor of this type required to be miniaturized, there is applied a so-called fixed-positional pre-load without the use of a spring or the like. However, the coefficient of linear expansion of silicon nitride is about ⅓ of that of bearing steel generally used for inner/outer rings. Thus, the pre-load disadvantageously undergoes a great change due to temperature variations.

For example, when at low temperature, the pre-load increases and exceeds the allowable limit, the bearing torque is increased to increase the power consumption of the motor. This is contradictory to energy saving. On the other hand, when at high temperature, the pre-load excessively decreases, the rotational precision is lowered to produce reading and/or writing errors.

SUMMARY OF THE INVENTION

In view of the foregoing, the present invention is proposed with the object of providing a rolling bearing of the fixed-positional pre-load applied type in which the pre-load is stable in spite of temperature variations.

To achieve this object, the present invention provides, as a preferred embodiment, a rolling bearing comprising an inner ring, an outer ring, and a plurality of rolling elements interposed between the inner and outer rings, and this rolling bearing is characterized in that each of the inner ring and the outer ring is made of steel of which coefficient of linear expansion is in the range of $9 \times 10^{-6}/°C.$ to $15 \times 10^{-6}/°C.$, and that each of the rolling elements is made of ceramics of which coefficient of linear expansion is in the range of $7 \times 10^{-6}/°C.$ to $15 \times 10^{-6}/°C.$ The difference in coefficient of linear expansion between the steel and the ceramics, is preferably $5.0 \times 10^{-6}/°C.$ or less, and more preferably $3.0 \times 10^{-6}/°C.$ or less.

According to this embodiment, each of the rolling elements has a coefficient of linear expansion close to that of stainless steel. Accordingly, the rolling bearing of this embodiment can suitably be used, for example, in a spindle motor having a rotor hub made of stainless steel. More specifically, when the rotor hub is made of stainless steel, it is preferable that each of the inner and outer rings is made of stainless steel or has a coefficient of linear expansion substantially equal to that of stainless steel. In such a case, it is preferable, in view of the control of change in pre-load due to temperature variations, to use rolling elements each of which has a coefficient of linear expansion close to that of stainless steel.

In a rolling bearing in which the inner and outer rings are made of an iron-containing material the change in pre-load due to temperature variations can be reduced. Accordingly, when the rolling bearing of this embodiment is used, for example, in a hard disk driving spindle motor of which rotor hub is made of stainless steel, a reading/writing error is prevented from being caused and the rotational resistance is reduced to contribute to energy saving.

DETAILED DESCRIPTION OF THE PREFERRED EMBODIMENT

The following description will discuss preferred embodiments of the present invention with reference to the attached drawings.

Figure 1:
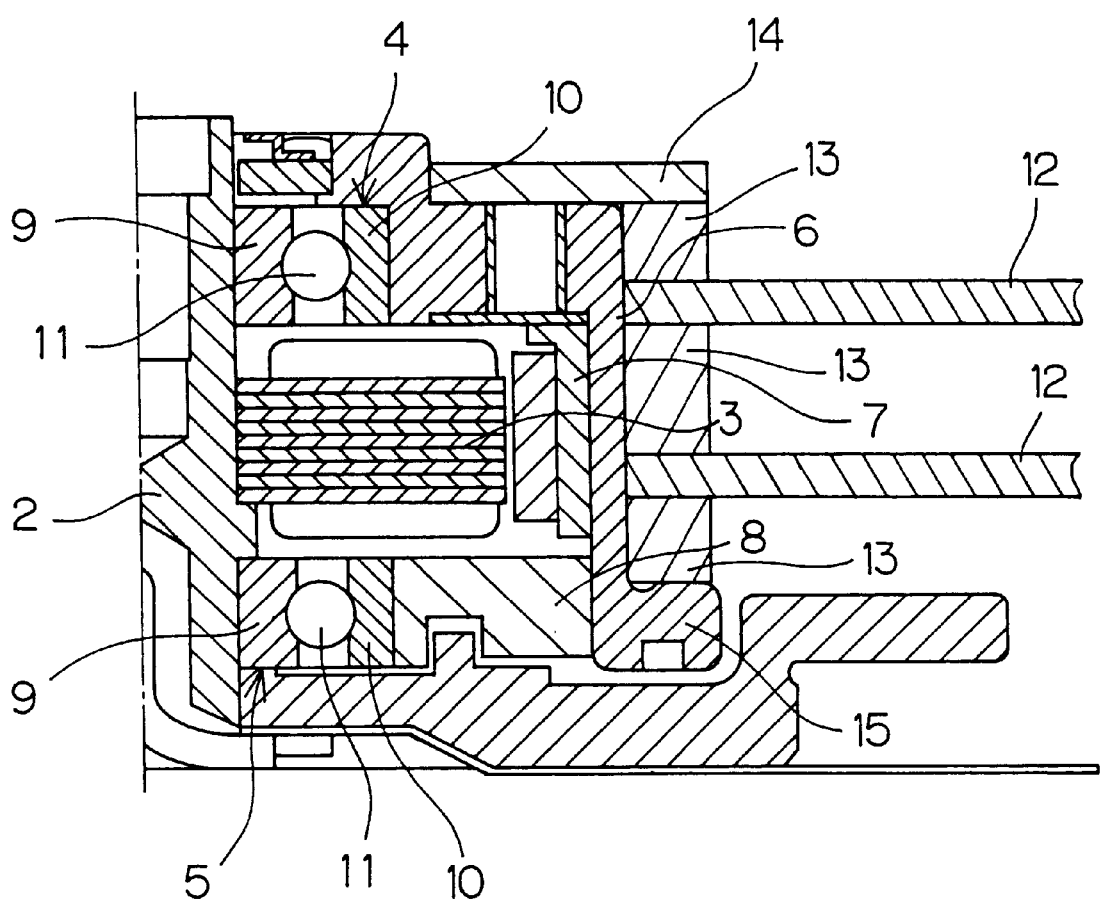
FIG. 1 is a schematic section view of a spindle motor to which applied is a rolling bearing according to an embodiment of the present invention.

FIG. 1 is a schematic section view of a spindle motor for driving an information recording disk such as a hard disk, which spindle motor comprises a rolling bearing according to an embodiment of the present invention. It is a matter of course that according to the present invention, the spindle motor can be used for driving any other recording medium than a hard disk. Further, the rolling bearing of the present invention can be used as incorporated in any brushless direct-drive motor. For example, the rolling bearing of the present invention can be used as incorporated in a spindle motor for driving a polygon mirror.

In FIG. 1, a spindle motor 1 has a stationary shaft member 2 and a stator core 3 put on and secured to the axial center portion of the stationary shaft member 2. Attached to the stationary shaft member 2 are the inner peripheries of ball bearings 4,5, as rolling bearings of the present invention, which are disposed on and under the stator core 3 such that the stator core 3 is sandwiched therebetween. These ball bearings 4,5 are fitted in, and rotatably support a rotor hub 6, made of stainless steel for example, which is disposed for holding the inner periphery of each information recording disk 12 such as a hard disk or the like. Secured to the inner periphery of the rotor hub 6 is a rotor yoke 7 which surrounds the circumference of the stator core 3.

The upper ball bearing 4 rotatably supports directly the upper portion of the rotor hub 6 substantially in a cup shape. The lower ball bearing 5 rotatably supports the lower portion of the rotor hub 6 through an annular member 8 made of stainless steel for example. The ball bearings 4,5 and rotor hub 6 collectively form a ball bearing arrangement.

Each of the ball bearings 4,5 comprises an inner ring 9 secured to the outer peripheral surface of the stationary shaft member 2, an outer ring 10 secure to the inner peripheral surface of the annular member 8 or the rotor hub 6, and a plurality of balls 11, serving as rolling elements, interposed between the inner ring 9 and the outer ring 10. The balls 11 are circumferentially disposed at regular intervals by cages (not shown).

A plurality of information recording disks 12 are put and fixed on the outer periphery of the rotor hub 6. The information recording disks 12 may be made of aluminium or glass, or may chiefly be made of glass. Laminated axially of the rotor hub 6 are the information recording disks 12 alternating with annular spacers 13 also put on the rotor hub 6. Such a laminated body of the disks 12 and the spacers 13 is held by and between a circular fixing plate 14 screwed to the upper portion of the rotor hub 6 and a receiving portion 15 at the lower portion of the rotor hub 6. Thus, the laminated body is held rotatably in association with the rotor hub 6.

When the rotor hub 6 is made of stainless steel, an iron-type material having a coefficient of linear expansion substantially equal to that of stainless steel, is preferably used as the material of the ball bearings 4,5 and the annular member 8 which are disposed inside of the inner periphery of the rotor hub 6.

For example, there may be used, for each of the inner ring 9 and the outer ring 10, high-carbon chromium bearing steel or stainless steel of which coefficient of linear expansion is in the range of $9 \times 10^{-6}/°$ C. to $15 \times 10^{-6}/°$ C. Examples of the high-carbon chromium bearing steel include, among others, SUJ1, SUJ2 and SUJ3 according to the JIS (Japanese Industrial Standards). Examples of the stainless steel include, among others, SUS430 and SUS440 according to the JIS each of which is martensite stainless steel.

The inner ring 9 and the outer ring 10 may respectively be made of materials having the same coefficient of linear expansion, for example high-carbon chromium bearing steel of SUJ2 according to the JIS. However, the inner ring 9 is preferably higher in coefficient of linear expansion than the outer ring 10. More specifically, when a bearing is increased in temperature, the pre-load generally tends to decrease. It is therefore required to make provision such that the pre-load does not become below the allowable lower limit within the service temperature range. For example, it is preferable to assure a pre-load of 0.5 kgf or more when the temperature increases to 100° C.

The balls 11 are preferably made of ceramics of which coefficient of linear expansion is in the range of $7 \times 10^{-6}/°$ C. to $15 \times 10^{-6}/°$ C. More specifically, when the rotor hub 6 is made of stainless steel, the outer rings are preferably made of stainless steel or a material of which coefficient of linear expansion is substantially equal to that of the stainless steel. In such a case, when the balls are made of ceramics of which coefficient of linear expansion is close to that of the stainless steel, the pre-load hardly undergoes a change due to temperature variations.

There can be stated zirconia and alumina as examples of the ceramics of which coefficient of linear expansion is in the range of $7 \times 10^{-6}/°$ C. to $15 \times 10^{-6}/°$ C.

Zirconia has a coefficient of linear expansion in the range of, for example, $8.7 \times 10^{-6}/°$ C. to $11.4 \times 10^{-6}/°$ C. Alumina has a coefficient of linear expansion in the range of, for example, $8.6 \times 10^{-6}/°$ C. to $9.6 \times 10^{-6}/°$ C. The coefficient of linear expansion of each of zirconia and alumina is close to the coefficient of linear expansion of the stainless steel. This makes it difficult that the pre-load varies with temperature.

Zirconia and alumina are lower in strength than silicon nitride or the like to be generally used for bearings. However, each of zirconia and alumina has sufficient strength as far as the ball bearing is used in an OA device such as a hard disk driving spindle motor or the like. More specifically, a spindle motor in an OA device or the like is generally used with a light pre-load 1.5 to 2% of the rated load applied to the ball bearing.

According to this embodiment, the coefficient of linear expansion of the balls 11 is close to that of stainless steel, and the bearings are used in the spindle motor 1 having the rotor hub 6 of stainless steel. This minimizes the change in pre-load due to temperature variations. As a result, the rotational precision at high temperature can be maintained high. This prevents a reading/writing error from being caused when the spindle motor is used for driving a hard disk. Further, the increase in pre-load at low temperature is restrained to reduce the rotational resistance. This contributes to energy saving.

The present invention should not be limited to the embodiment above-mentioned. For example, the present invention may be applied to a rolling bearing of the inner-ring rotational type although the embodiment abovementioned is of the outer-ring rotational type. Further, various changes can be made within the scope of the present invention.

Tests

There were produced a rolling bearing of Example 1, a rolling bearing of Example 2 and a rolling bearing of Comparative Example, on each of which a test was conducted for measuring the changes in pre-load due to temperature variations.

EXAMPLE 1

There was prepared a rolling bearing of Example 1 having an inner ring of 5 mm in inner diameter, an outer ring of 13 mm in outer diameter, and eight balls each having a diameter of 2 mm, the width in the axial direction of the inner ring and the outer ring being 4 mm. In Example 1, each of the inner and outer rings was made of SUJ2 according to the JIS of which coefficient of linear expansion was $12.5 \times 10^{-6}/°$ C., and the balls were made of zirconia of which coefficient of linear expansion was $10.1 \times 10^{-6}/°$ C. The pre-load at 20° C. was set to 1.2 kgf.

EXAMPLE 2

There was prepared a rolling bearing of Example 2 having the same sizes with those in Example 1. In Example 2, the inner ring was made of SUJ2 according to the JIS of which coefficient of linear expansion was $12.5 \times 10^{-6}/°$ C., the outer ring was made of SUS440C according to the JIS of which coefficient of linear expansion was $10.5 \times 10^{-6}/°$ C., and the balls were made of zirconia of which coefficient of linear expansion was $10.1 \times 10^{-6}/°$ C. The pre-load at 20° C. was set to 1.2 kgf.

COMPARATIVE EXAMPLE

There was prepared a rolling bearing of Comparative Example having the same sizes with those in Example 1. In Comparative Example, each of the inner and outer rings was made of SUJ2 according to the JIS of which coefficient of linear expansion was $12.5 \times 10^{-6}/°$ C., and the balls were made of silicon nitride of which coefficient of linear expansion was $3.2 \times 10^{-6}/°$ C. The pre-load at 20° C. was set to 1.2 kgf.

Test Results

Figure 2:
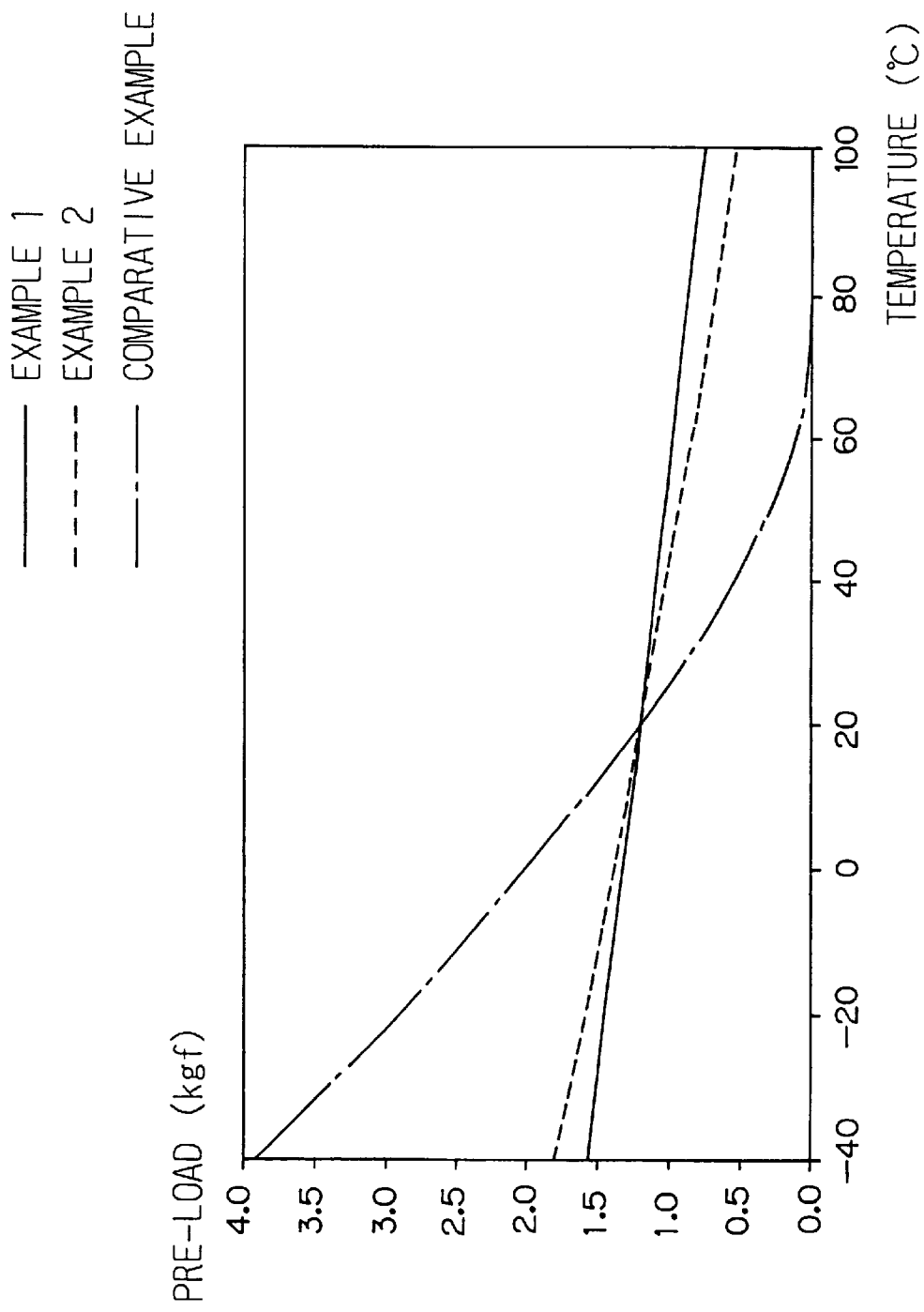
FIG. 2 is a graph illustrating the changes in pre-load, due to temperature variations, of the rolling bearings of Examples and Comparative Example.

Examples 1, 2 and Comparative Example were measured for the changes in pre-load in the temperature range from −40° C. to 100° C. FIG. 2 shows the test results.

In Comparative Example, the pre-load greatly varied with temperature. That is, when the temperature rose to about 40° C., the pre-load was lowered to 0.5 kgf which is the allowable lower limit. Further, when the temperature rose to about 70° C., the pre-load became zero. This may cause a reading/writing error when the rolling bearing of Comparative Example is used in a spindle motor for driving a hard disk. Moreover, the increase in pre-load as the temperature is lowered, is great.

On the other hand, a substantially constant pre-load was maintained in each of Examples 1 and 2. At temperature of 100° C., each of Examples 1 and 2 provided a pre-load greater than the allowable lower limit or 0.5 kgf. Further, the increase in pre-load as the temperature is lowered, is very gentle. In particular, the inner ring in Example 2 is greater in coefficient of linear expansion than the outer ring. Accordingly, the decrease in pre-load with the rise of temperature can be very small.

When the rolling bearing of each of Examples 1 and 2 is used in a spindle motor for driving a hard disk, the pre-load is stable, enabling the rotational precision to be maintained high in spite of temperature variations. It is therefore considered that a reading/writing error is not caused.

What is claimed is:

1. A rolling bearing, comprising:
    an inner ring;
    an outer ring; and
    a plurality of rolling elements interposed between the inner and outer rings, wherein
        each of the inner ring and the outer ring is made of steel having a coefficient of linear expansion in a range of $9 \times 10^{-6}/°$ C. to $15 \times 10^{-6}/°$ C.;
        each of the rolling elements is made of ceramics having a coefficient of linear expansion in a range of $7 \times 10^{-6}/°$ C. to $15 \times 10^{-6}/°$ C.; and
        the inner ring has a coefficient of linear expansion that is greater than a coefficient of linear expansion of the outer ring.

2. A rolling bearing according to claim 1, wherein a difference in coefficient of linear expansion between the steel and the ceramics, is $5.0 \times 10^{-6}/°$ C. or less.

3. A rolling bearing according to claim 1, wherein a difference in coefficient of linear expansion between the steel and the ceramics, is $3.0 \times 10^{-6}/°$ C. or less.

4. A rolling bearing according to claim 1, wherein the ceramics is at least one material selected from the group consisting of zirconia of which a coefficient of linear expansion is in a range of $8.7 \times 10^{-6}/°$ C. to $11.4 \times 10^{-6}/°$ C., and alumina of which a coefficient of linear expansion is in a range of $8.6 \times 10^{-6}/°$ C. to $9.6 \times 10^{-6}/°$ C.

5. A rolling bearing according to claim 1, wherein the inner ring is made of high-carbon chromium bearing steel and the outer ring is made of stainless steel.

6. A rolling bearing device, comprising:
    an inner member;
    an outer member;
    an inner ring;
    an outer ring; and
    a plurality of rolling elements interposed between the inner and outer rings, the inner and outer members being rotatable relatively to each other, the inner and outer rings being disposed between the inner and outer members, wherein
        each of the inner member, the outer member, the inner ring and the outer ring, is made of steel having a coefficient of linear expansion in a range of $9 \times 10^{-6}/°$ C. to $15 \times 10^{-6}/°$ C.;
        each of the rolling elements is made of ceramics having a coefficient of linear expansion in a range of $7 \times 10^{-6}/°$ C. to $15 \times 10^{-6}/°$ C.;
        a difference in coefficient of linear expansion between the steel and the ceramics, is $3.0 \times 10^{-6}/°$ C. or less; and
        the inner ring has a coefficient of linear expansion that is greater than a coefficient of linear expansion of the outer ring.

7. A ball bearing arrangement for a hard disc spindle, comprising:
    a rolling bearing, the rolling bearing including:
        an inner ring;
        an outer ring; and
        a plurality of rolling elements interposed between the inner and outer rings; and
    a stainless steel hub, said rolling bearing being fitted in said hub, wherein
        the rolling bearing is adapted to receive a fixed-positional pre-load;
        each of the inner ring and the outer ring is made of steel having a coefficient of linear expansion in a range of $9 \times 10^{-6}/°$ C. to $15 \times 10^{-6}/°$ C.;
        each of the rolling elements is made of ceramics having a coefficient of linear expansion in a range of $7 \times 10^{-6}/°$ C. to $15 \times 10^{-6}/°$ C.; and
        the inner ring has a coefficient of linear expansion that is greater than a coefficient of linear expansion of the outer ring.

* * * * *